(12) United States Patent
Miyaishi et al.

(10) Patent No.: US 10,315,504 B2
(45) Date of Patent: Jun. 11, 2019

(54) DISPLAYED ROTATIONAL SPEED CONTROL APPARATUS FOR VEHICLE

(71) Applicants: JATCO Ltd, Fuji-shi, Shizuoka (JP); NISSAN MOTOR CO., LTD., Yokohama-shi, Kanagawa (JP)

(72) Inventors: Hironori Miyaishi, Sagamihara (JP); Akito Suzuki, Tokyo (JP); Tetsuya Izumi, Ayase (JP); Toshiaki Motomura, Kanagawa (JP)

(73) Assignees: JATCO Ltd, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 33 days.

(21) Appl. No.: 15/569,478

(22) PCT Filed: Mar. 3, 2016

(86) PCT No.: PCT/JP2016/056530
§ 371 (c)(1),
(2) Date: Oct. 26, 2017

(87) PCT Pub. No.: WO2016/174920
PCT Pub. Date: Mar. 11, 2016

(65) Prior Publication Data
US 2018/0297465 A1   Oct. 18, 2018

(30) Foreign Application Priority Data

Apr. 27, 2015 (JP) ................................ 2015-090337

(51) Int. Cl.
*B60K 35/00* (2006.01)
*B60R 16/02* (2006.01)
(Continued)

(52) U.S. Cl.
CPC .............. *B60K 6/387* (2013.01); *B60K 6/543* (2013.01); *B60K 35/00* (2013.01); *B60L 3/00* (2013.01); *B60L 11/14* (2013.01); *B60R 16/02* (2013.01); *B60W 10/06* (2013.01); *B60W 10/08* (2013.01); *B60W 10/107* (2013.01); *B60W 10/111* (2013.01); *B60W 20/10* (2013.01);
(Continued)

(58) Field of Classification Search
CPC ..................................................... B60K 35/00
See application file for complete search history.

(56) References Cited

FOREIGN PATENT DOCUMENTS

| JP | 2012-025227 A | 2/2012 |
|----|---------------|--------|
| JP | 2015-024766 A | 2/2015 |
| JP | 2015-034595 A | 2/2015 |

*Primary Examiner* — Todd M Melton
(74) *Attorney, Agent, or Firm* — Foley & Lardner LLP

(57) ABSTRACT

A displayed rotation speed control apparatus for a hybrid vehicle includes: a displayed rotation speed controller having a display mode in which a target primary rotation speed stepwisely set is displayed as a driving source rotation speed in the rotation speed display device in the simulated stepwise shift mode, when the mode is switched from the EV mode to the HEV mode to initiate a starting of the engine, and when the mode is switched from the continuous shift mode to the simulated stepwise shift mode while an actual engine speed is smaller than a predetermined rotation speed, the displayed rotation speed controller being configured to display a value obtained by retarding the actual engine speed, during a period from the initiation of the starting of the engine to a rotation speed smaller than a predetermined rotation speed.

6 Claims, 7 Drawing Sheets

(51) Int. Cl.
*B60K 6/387* (2007.10)
*B60L 3/00* (2019.01)
*B60L 11/14* (2006.01)
*F02D 29/02* (2006.01)
*B60K 6/543* (2007.10)
*B60W 10/06* (2006.01)
*B60W 10/08* (2006.01)
*B60W 10/107* (2012.01)
*B60W 10/111* (2012.01)
*F16H 63/42* (2006.01)
*B60W 20/10* (2016.01)
*F16H 61/36* (2006.01)
*F16H 61/66* (2006.01)
*B60K 6/48* (2007.10)
*B60W 50/14* (2012.01)

(52) U.S. Cl.
CPC ............ *F02D 29/02* (2013.01); *F16H 61/36* (2013.01); *F16H 63/42* (2013.01); *B60K 2006/4825* (2013.01); *B60W 2050/146* (2013.01); *B60W 2510/0638* (2013.01); *B60W 2510/1005* (2013.01); *F16H 2061/6615* (2013.01); *Y02T 10/6252* (2013.01); *Y02T 10/6286* (2013.01)

DISPLAYED ROTATIONAL SPEED CONTROL APPARATUS FOR VEHICLE

TECHNICAL FIELD

This invention relates to a displayed rotation speed control apparatus which is applied to a vehicle in which a continuously variable transmission is mounted in a driving system from a driving source to driving wheels.

BACKGROUND ART

Conventionally, there is known a control apparatus for a vehicle which displays a displayed rotation speed signal obtained by suppressing a detection signal of an engine speed in a tachometer (rotation speed display device) (for example, a patent document 1). In this control apparatus for the vehicle, at a variation of the engine speed, the displayed rotation speed signal is obtained by suppressing the variation of the detection signal of the engine speed when the engine speed is equal to or greater than a predetermined rotation speed. Moreover, at the variation of the engine speed, the displayed rotation speed signal is set without suppressing the variation when the engine speed is smaller than the predetermined rotation speed.

However, in the conventional control apparatus for the vehicle, a hybrid vehicle includes an engine and a traveling motor which are driving sources, and a continuously variable transmission disposed between the traveling motor and driving wheels. In a case where the continuously variable transmission has a simulated stepwise shift mode in which a transmission gear ratio is stepwisely varied by setting a target input rotation speed so as to repeat gradual increase and sudden decrease of the transmission input rotation speed during the acceleration, the unnatural feeling of the rotation speed display may be provided to the driver due to the engine speed displayed in the tachometer in the simulated stepwise shift mode.

PRIOR ART DOCUMENT

Patent Document

Patent Document 1: Japanese Patent Application Publication No. 2012-025227

SUMMARY OF THE INVENTION

It is, therefore, an object of the present invention to provide a displayed rotation speed control apparatus for a vehicle devised to solve the above-mentioned problems, and to decrease the unnatural feeling of the rotation speed display provided to the driver.

For attaining the above-described objects, in the present invention, a displayed rotation speed control apparatus for a hybrid vehicle including an engine and a traveling motor which are driving sources, and a continuously variable transmission disposed between the traveling motor and driving wheels, the hybrid vehicle having an EV mode in which the traveling motor is used as the driving source, an HEV mode in which the engine and the traveling motor are used as the driving sources, a continuous shift mode in which a transmission gear ratio of the continuously variable transmission is continuously varied, and a simulated stepwise shift mode in which the transmission gear ratio of the continuously variable transmission is stepwisely varied, the displayed rotation speed control apparatus comprises: a displayed rotation speed controller configured to produce a displayed rotation speed signal to a rotation speed display device disposed within a vehicle interior, the displayed rotation speed controller having a display mode in which a target primary rotation speed stepwisely set is displayed as a driving source rotation speed in the rotation speed display device in the simulated stepwise shift mode, when the mode is switched from the EV mode to the HEV mode to initiate a starting of the engine, and when the mode is switched from the continuous shift mode to the simulated stepwise shift mode while an actual engine speed is smaller than a predetermined rotation speed, the displayed rotation speed controller being configured to display a value obtained by retarding the actual engine speed, during a period from the initiation of the starting of the engine to a rotation speed smaller than a predetermined rotation speed.

Accordingly, in the simulated stepwise shift mode, the target primary rotation speed is displayed as the driving source rotation speed in the rotation speed display device by the display rotation speed controller. Moreover, when the mode is switched from the EV mode to the HEV mode to initiate a starting of the engine, and when the mode is switched from the continuous shift mode to the simulated stepwise shift mode while an actual engine speed is smaller than a predetermined rotation speed, the displayed rotation speed controller being configured to display a value obtained by retarding the actual engine speed, during a period from the initiation of the starting of the engine to a rotation speed smaller than a predetermined rotation speed.

That is, in the simulated stepwise shift mode, the target primary rotation speed indicative of the direct stepwise shift feeling is displayed as the driving source rotation speed in the rotation speed display device. Accordingly, in the simulated stepwise shift mode, it is possible to decrease the unnatural feeling of the rotation speed to the driver, relative to the display by retarding relative to the actual engine speed, and the display of the actual engine speed.

Accordingly, it is possible to decrease the unnatural feeling of the rotation speed display provided to the driver, in the simulated stepwise shift mode.

DESCRIPTION OF EMBODIMENTS

Hereinafter, a first embodiment to attain a displayed rotation speed control apparatus for a vehicle is explained with reference to the drawings.

First Embodiment

Firstly, a configuration is explained.

A displayed rotation speed control apparatus according to the first embodiment is applied to an FF hybrid vehicle (one example of a hybrid vehicle) including left and right front wheels which are driving wheels, and a belt type continuously variable transmission which is a transmission. Hereinafter, a configuration of the displayed rotation speed control apparatus for the FF hybrid vehicle according to the first embodiment is explained about "Overall System Configuration", "Shift Control Configuration in Continuous Shift Mode", "Shift Control Configuration in Simulated Stepwise Shift Mode", and "Displayed Rotation Speed Control Process Configuration".

[Overall System Configuration]

Figure 1:
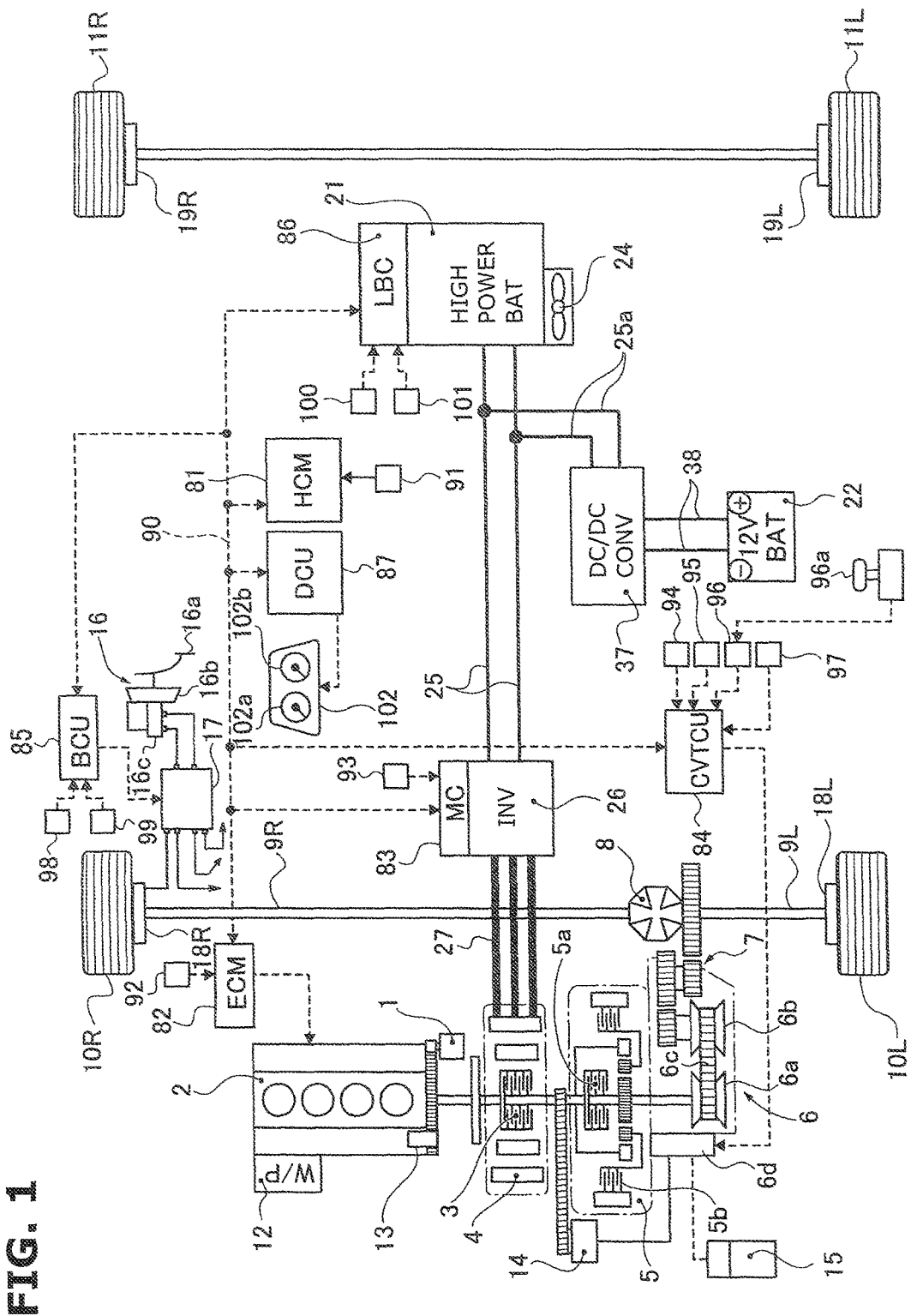
FIG. 1 is an overall system configuration showing an FF hybrid vehicle to which a control apparatus according to a first embodiment is applied.

FIG. 1 is an overall system configuration of the FF hybrid vehicle to which the displayed rotation speed control apparatus according to the present invention is applied". Hereinafter, the overall system configuration of the FF hybrid vehicle is explained with reference to FIG. 1.

As shown in FIG. 1, a driving system of the FF hybrid vehicle includes a transverse engine 2 (driving source, engine); a first clutch 3 (abbreviated to "CL1"); a motor generator 4 (driving source, traveling motor, abbreviated to "MG"); a second clutch 5 (abbreviated to "CL2"); and a belt type continuously variable transmission 6 (continuously variable transmission, abbreviated to "CVT"). An output shaft of the belt type continuously variable transmission 6 is drivingly connected to left and right front wheels 10R and 10L through a final speed reduction gear train 7, a differential gear 8, and left and right drive shafts 9R and 9L. Besides, left and right rear wheels 11R and 11L are driven wheels.

The transverse engine 2 is an engine which includes a starter motor 1, and which is disposed in a front room so that a crank shaft direction becomes a vehicle width direction. The transverse engine 2 includes an electric water pump 12; and a crank shaft rotation sensor 13 arranged to sense a reverse rotation of the transverse engine 2. This transverse engine 2 has starting methods of a "starter start mode" in which the engine is cranked by the starter motor 1 that uses a 12 V battery 22 as a power source (power supply), and a "MG start mode" in which the engine 2 is cranked by the motor generator 4 while slip-engaging the first clutch 3. The "starter start mode" is selected when a low temperature condition or a high temperature condition is satisfied. The "MG start mode" is selected at the engine start on conditions other than the starter starting.

The motor generator 4 is a permanent magnet type synchronous motor of three phase alternating current which is connected through the first clutch 3 to the transverse engine 2. This motor generator 4 uses a high power battery 21 (described later) as the power source (the power supply). A stator coil is connected through AC harnesses 27 to an inverter 26 arranged to convert a direct current to a three phase alternating current at a power running, and to convert the three phase alternating current to the direct current at a regeneration.

The second clutch 5 is a wet-type multiple plate frictional clutch which is disposed between the motor generator 4 and the left and right front wheels 10R and 10L which are driving wheels, and which is hydraulically actuated. The second clutch 5 is controlled among a full engagement, a slip engagement, a disengagement by a second clutch hydraulic pressure. In the first embodiment, the second clutch 5 is a forward clutch 5a and a reverse brake 5b which are provided to a forward and reverse switching mechanism of a planetary gear. That is, the forward clutch 5a is used as the second clutch 5 at the forward traveling. The reverse brake 5b is used as the second clutch 5 at the reverse traveling.

The belt type continuously variable transmission 6 includes a primary pulley 6a; a secondary pulley 6b; and a belt 6c wound around the both pulleys 6a and 6b. The belt type continuously variable transmission 6 is a transmission arranged to attain a continuous (stepless) transmission gear ratio by varying winding radii of the belt 6c by a primary pressure and a secondary pressure which are supplied to a primary hydraulic chamber and a secondary hydraulic chamber. The belt type continuously variable transmission 6 includes a main oil pump 14 (mechanically driven) which is a hydraulic source, and which is driven and rotated by a motor shaft (=transmission input shaft) of the motor generator 4; and a sub oil pump 15 (driven by motor) which is a hydraulic source, and which is used as an auxiliary pump. Moreover, the belt type continuously variable transmission 6 includes a control valve unit 6d arranged to produce a first clutch pressure, a second clutch pressure, the primary pressure, and the secondary pressure from a line pressure PL produced by regulating a pump discharge pressure from the hydraulic source.

A hybrid drive system referred to as a 1 motor/2 clutch is constituted by the first clutch 3, the motor generator 4, and the second clutch 5. This hybrid drive system has main driving modes of an "EV mode", an "HEV mode", and a "(HEV)WSC mode". The "EV mode" is an electric vehicle mode in which the first clutch 3 is disengaged, in which the second clutch 5 is engaged, and in which the only motor generator 4 is used as the driving source. The traveling by the "EV mode" is referred to as an "EV traveling". The "HEV mode" is a hybrid vehicle mode in which the both clutches 3 and 5 are engaged, and in which the transverse engine 2 and the motor generator 4 are used as the driving sources. The travelling by the "HEV mode" is referred to as an "HEV traveling". The "WSC mode" is a CL2 slip engagement mode in which the motor generator 4 is controlled by the motor rotation speed in the "HEV mode", and in which the second clutch 5 is slip-engaged by an engagement torque capacity corresponding to a required driving force. The "WSC mode" is selected for absorbing, by the CL2 slip engagement, a rotation difference between the left and right front wheels 10L and 10R and the transverse engine 2 rotated by an engine idling rotation speed in a start region from the vehicle stop, or in a vehicle stop region from a low speed in the "HEV mode". The "WSC mode" is needed since the driving system does not include a rotation difference absorbing coupling joint such as a torque converter.

As shown in FIG. 1, a control system of the FF hybrid vehicle includes a brake operation unit 16; a brake hydraulic control unit 17; left and right front wheel brake units 18R and 18L; and left and right rear wheel brake units 19R and 19L. In this control system, a regeneration cooperative control is performed when the regeneration is performed by the motor generator 4 at the brake operation. In the regeneration cooperative control, the hydraulic braking force takes charge of an amount obtained by subtracting the regeneration braking force from the required braking force with respect to the required braking force based on the brake pedal operation.

The brake operation unit 16 includes a brake pedal 16a ; a negative pressure booster 16b arranged to use a suction negative pressure of the transverse engine 2; a master cylinder 16c, and so on. This regeneration cooperative brake unit 16 is arranged to produce a predetermined master cylinder pressure in accordance with a brake depression force added by a driver to the brake pedal 16a . The regeneration cooperative brake unit 16 has a simple configuration in which an electric booster is not used.

The brake hydraulic control unit 17 includes an electric oil pump (not shown); a pressure increase solenoid valve (not shown); a pressure decrease solenoid valve (not shown); a hydraulic passage switching valve (not shown), and so on. A function to generate a wheel cylinder hydraulic pressure at an non-operation of the brake, and a function to regulate the wheel cylinder hydraulic pressures at the brake operation are attained by controlling the brake hydraulic control unit 17 by a brake control unit 85. Controls to use the hydraulic pressure generating function at the brake non-operation are a traction control (TCS control), a vehicle behavior control (VDC), an emergency brake control (automatic brake control), and so on. Controls to use the hydraulic pressure regulating function at the brake operation are the regeneration cooperative control, an anti-lock brake control (ABS control), and so on.

The left and right front wheel brake units 18R and 18L are provided, respectively, to the left and right front wheels 10R and 10L to provide the hydraulic braking forces to the left and right front wheels 10R and 10L. The left and right rear wheel brake units 19R and 19L are provided, respectively, to the left and right rear wheels 11R and 11L to provide the hydraulic braking forces to the left and right rear wheels 11R and 11L. These brake units 18R, 18L, 19R, and 19L include wheel cylinders (not shown) to which the brake hydraulic pressure produced by the brake hydraulic control unit 17 is supplied.

As shown in FIG. 1, the power source system of the FF hybrid vehicle includes a high power battery 21 which is a power source of the motor generator 4; and the 12V battery 22 which is a driving source for 12V system loads.

The high power battery 21 is a secondary battery which is a power source of the motor generator 4. For example, the high power battery 21 is a lithium ion battery in which cell modules including a plurality of cells are mounted within a battery pack case. A junction box is installed in the high power battery 21. Relay circuits arranged to perform supply/disconnection/distribution of the high voltage are concentrated within the junction box. Moreover, the high power battery 21 is provided with a cooling fan unit 24 having a battery cooling function, and a lithium battery controller 86 arranged to monitor a battery charging capacity (battery SOC) and a battery temperature.

The high power battery 21 and the motor generator 4 are connected with each other through the DC harnesses 25, the inverter 26, and the AC harnesses 27. The inverter 26 is provided with a motor controller 83 arranged to perform the power running/regeneration control. That is, the inverter 26 is configured to convert the direct current from the DC harnesses 25 to the three phase alternating current to the AC harnesses 27 at the power running at which the motor generator 4 is driven by the discharge of the high power battery 21. Moreover, the inverter 26 is configured to convert the three phase alternating current from the AC harnesses 27 to the direct current to the DC harnesses 25 at the regeneration at which the high power battery 21 is charged by the electric power generation by the motor generator 4.

The 12V battery 22 is a secondary battery which is a power source of the 12V system loads that are the starter motor 1, auxiliary equipment and so on. For example, a lead battery mounted on an engine vehicle and so on is used as the 12V battery 22. The high power battery 21 and the 12V battery 22 are connected through DC branch harnesses 25a, a DC/DC converter 37, and battery harnesses 38. The DC/DC converter 37 is configured to convert a voltage of several hundred volts from the high power battery 21 to 12V. This DC/DC converter 37 is controlled by a hybrid control module 81 so as to monitor the charging amount of the 12V battery 22.

As shown in FIG. 1, an electric control system of the FF hybrid vehicle includes the hybrid control module 81 (abbreviated to "HCM") which is an electric control unit configured to have an integral control function to appropriately monitor the consumed energy of the overall vehicle. The electric control system includes other electric control units of an engine control module 82 (abbreviated to "ECM"); the motor controller 83 (abbreviated to "MC"); and a CVT control unit 84 (abbreviated to "CVICU", shift mode switching controller). Moreover, the electric control system includes the brake control unit 85 (abbreviated to "BCU"); the lithium battery controller 86 (abbreviated to "LBC"); and a display control unit 87 (abbreviated to "DCU", displayed rotation speed controller). These electric control units 81, 82, 83, 84, 85, 86, and 87 are connected with one another to communicate information by CAN communication lines (CAN is an abbreviation of "Controller Area Network") in bidirectional manner. These electric control units 81, 82, 83, 84, 85, 86, and 87 share the information.

The hybrid control module 81 is configured to perform various integral control based on the input information from the other electric control units 82, 83, 84, 85, 86, and 87, an ignition switch 91, and so on.

The engine control module 82 is configured to perform a start control of the transverse engine 2, a stop control, a fuel injection control, an ignition control, a fuel cut control, and an engine idling rotation control of the transverse engine 2, and so on, based on the input information from the hybrid control module 81, an actual engine speed sensor 92 (actual engine speed sensing means, actual driving source rotation speed sensing means), and so on.

The motor controller 83 is configured to perform a power running control, a regeneration control, a motor creep control, a motor idling control of the motor generator 4, and so on, by a control command to the inverter 26, based on the input information from the hybrid control module 81, the motor rotation speed sensor 93, and so on.

The CVT control unit 84 is configured to output a control command to the control valve unit 6d based on the input information from the hybrid control module 81, an accelerator opening degree sensor 94, a vehicle speed sensor 95, an inhibitor switch 96 configured to sense an operation of a shift lever 96a (shift mode switching switch, switch), an ATF oil temperature sensor 97, and so on. This CVT control unit 84 is configured to perform an engagement hydraulic pressure control of the first clutch 3, an engagement hydraulic pressure control of the second clutch 5, a shift hydraulic pressure control (shift control to control the transmission gear ratio of the belt type continuously variable transmission 6) by the primary pressure and the secondary pressure of the belt-type continuously variable transmission 6, and so on.

The brake control unit 85 is configured to output a control command to the brake hydraulic pressure unit 17 based on the input information from the hybrid control module 81, the brake switch 98, a brake stroke sensor 99, and so on. This brake control unit 85 is configured to perform the TCS control, the VDC control, the automatic brake control, the regeneration cooperative control, the ABS control, and so on.

The lithium battery controller 86 is configured to monitor the battery SOC, the battery temperature, and so on of the high power battery 21, based on the input information from a battery voltage sensor 100, a battery temperature sensor 101, and so on.

The display control unit 87 is configured to produce a displayed rotation speed signal to a tachometer 102a (rotation speed displaying device) arranged to display the engine speed, based on the input information from the hybrid control module 81, the CVT control unit 84, the actual engine speed sensor 92, the accelerator opening degree sensor 94, the vehicle speed sensor 95, and so on.

This tachometer 102a is provided to a combination meter 102 including a vehicle information display device. This combination meter 102 is disposed within the vehicle interior. The combination meter 102 includes an engine coolant temperature meter (water temperature meter), a fuel level meter, and so on, in addition to the tachometer 102a. These meters (gauges) are, for example, analog type meter (meter with a needle).

[Shift Control Configuration in Continuous Shift Mode]

Figure 2:
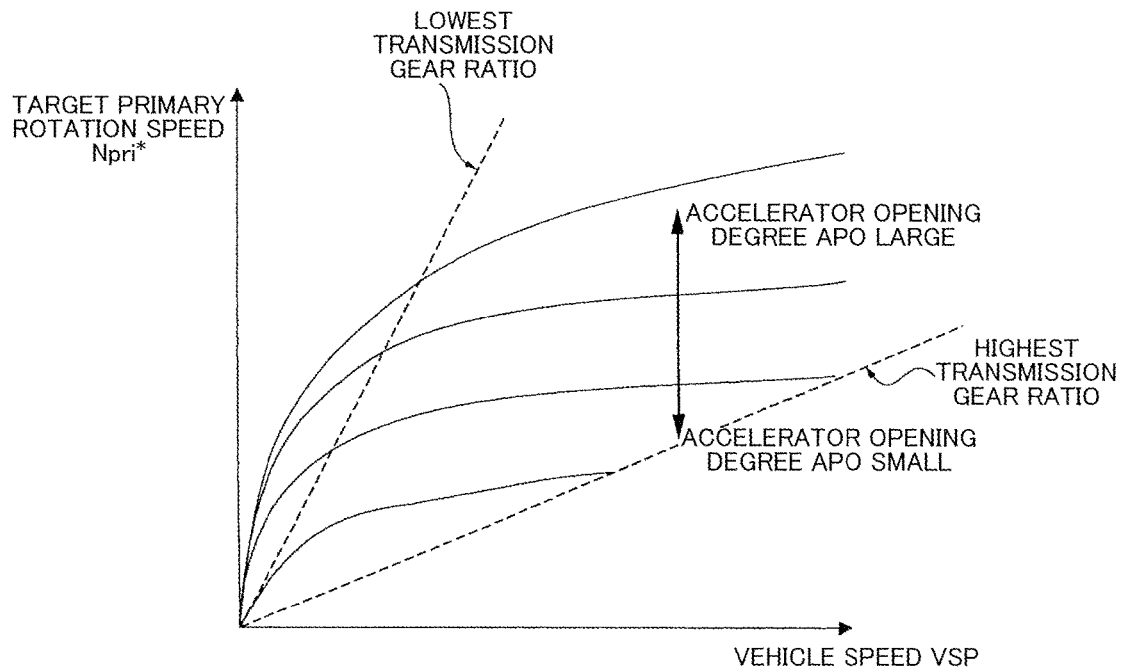
FIG. 2 is a continuous shift map diagram showing one example of a continuous shift map used when a "continuous shift mode" is selected in a CVT control unit 84 according to the first embodiment.

FIG. 2 shows one example of a continuous shift map used when the "continuous shift mode" is selected in the CVT control unit 84 according to the first embodiment. Hereinafter, the shift control configuration in the "continuously shift mode" is explained with reference to FIG. 2.

The CVT control unit 84 includes, as shift modes, the "continuous shift mode", a "linear shift mode (a simulated stepwise shift mode)", a "DSTEP shift mode (the simulated stepwise shift mode)", and a "manual shift mode (the simulated stepwise shift mode)". In the above-described shift modes, the "continuous shift mode" is configured to continuously vary the transmission gear ratio of the belt type continuously variable transmission 6 by using the continuous shift map shown in FIG. 2. The "continuous shift mode" is a normal shift mode which is performed when the "linear shift mode", the "DSTEP shift mode", or the "manual shift mode" is not selected.

The shift control in the "continuous shift mode" is a control configured to determine a target primary rotation speed Npri* corresponding to the vehicle speed VSP and the accelerator opening degree APO, with reference to the continuous shift map shown in FIG. 2, and to continuously vary the transmission gear ratio of the belt type continuously variable transmission 6 so that the actual primary rotation speed Npri corresponds to the target primary rotation speed Npri*. In this case, the continuous shift map shown in FIG. 2 is set to focus on the fuel economy. For example, when the accelerator opening degree APO is constant, the target primary rotation speed Npri* (=target input rotation speed) is maintained constant as much as possible. Moreover, in the continuous shift map, the transmission gear ratio is continuously varied in a transmission gear ratio range which is from the lowest transmission gear ratio which can be attained in the belt type continuously variable transmission 6, to the highest transmission gear ratio which can be attained in the belt type continuously variable transmission 6.

[Shift Control Configuration in Simulated Stepwise Shift Mode]

Figure 3:
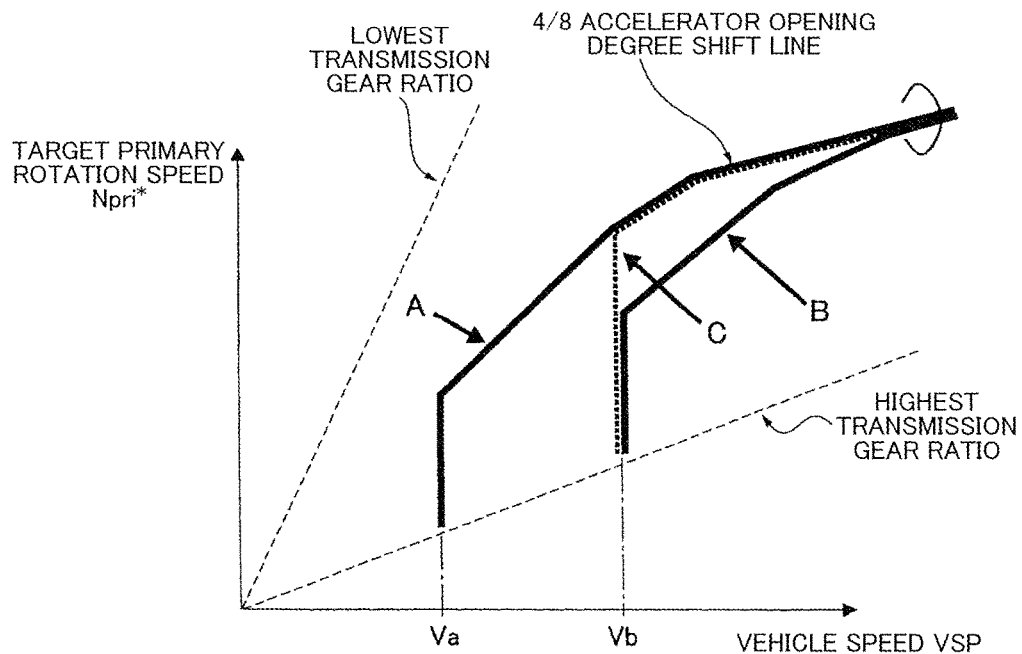
FIG. 3 is an acceleration shift line diagram showing one example of an acceleration shift line diagram showing one example of an acceleration shift line produced when a "linear shift mode" (=a simulated stepwise shift mode) is selected in the CVT control unit 84 according to the first embodiment.
Figure 4:
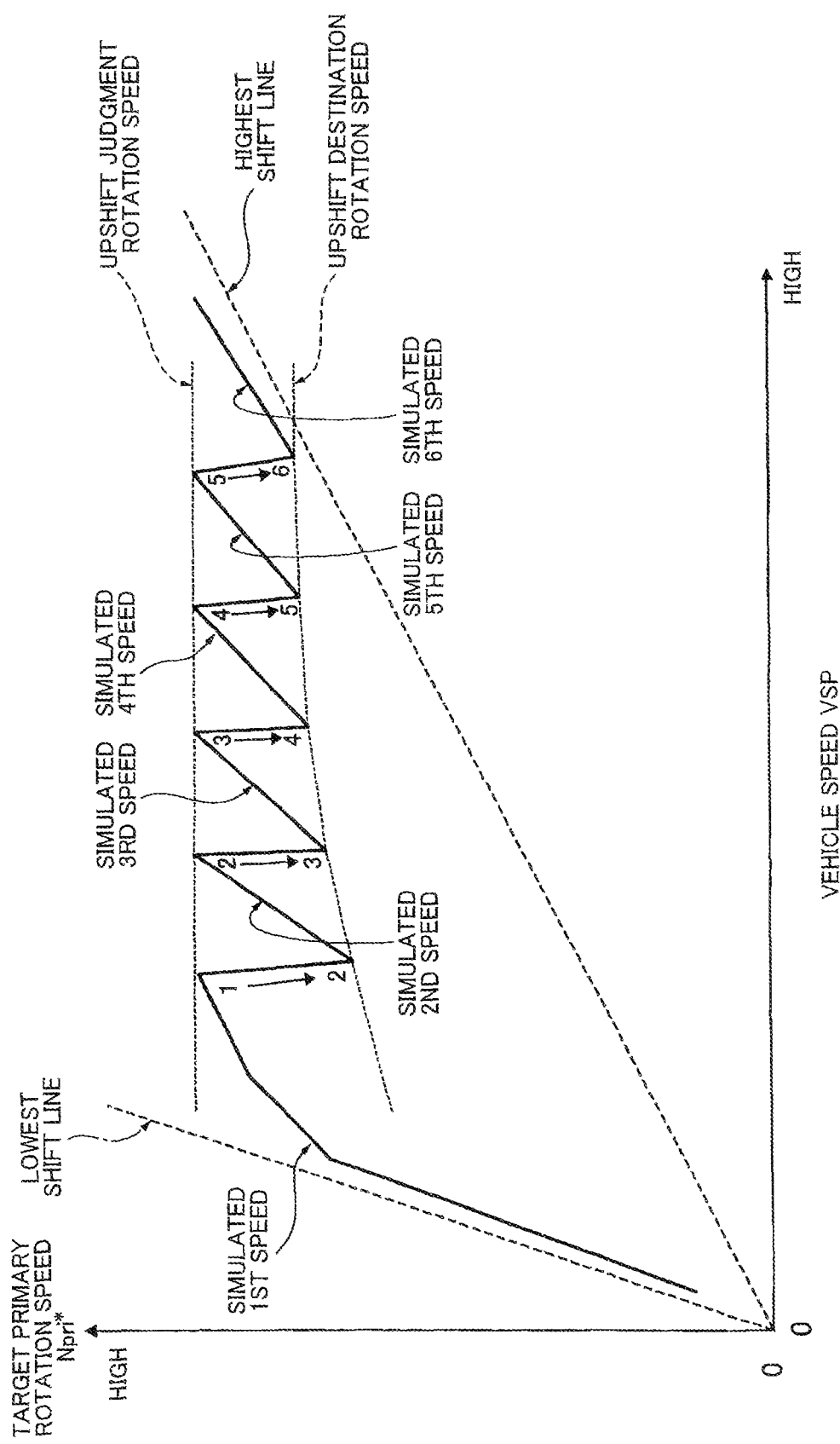
FIG. 4 is a DSTEP shift line diagram showing one example of a DSTEP shift line used when a "DSTEP shift mode" (=the simulated stepwise shift mode) is selected in the CVT control unit 84 according to the first embodiment.
Figure 5:
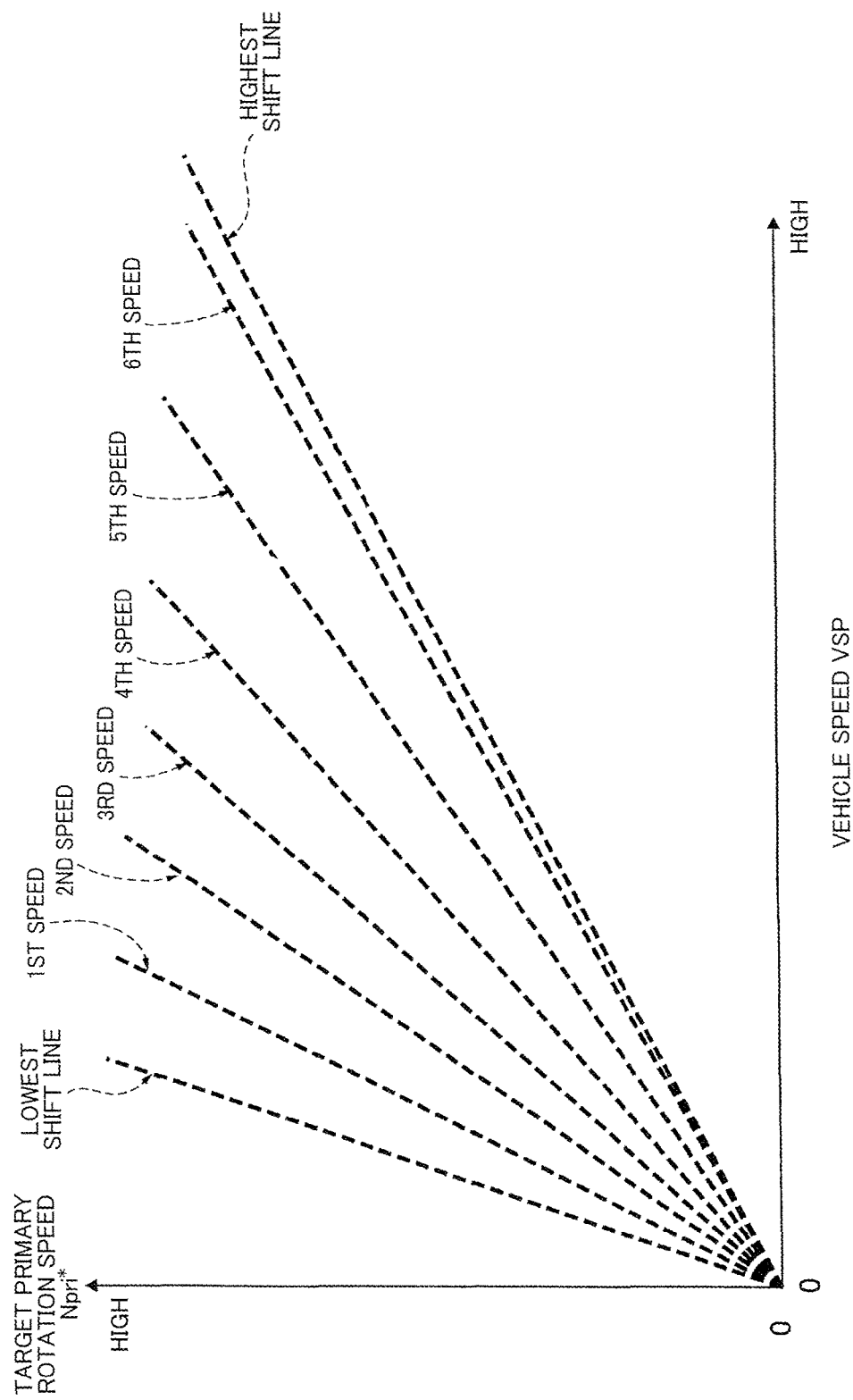
FIG. 5 is a manual shift line diagram showing one example of a manual shift line used when a "manual shift mode" (=the simulated stepwise shift mode) is selected in the CVT control unit 84 according to the first embodiment.

FIG. 3 to FIG. 5 show examples of shift lines used when the "the simulated stepwise shift mode" is selected in the CVT control unit 84 according to the first embodiment. Hereinafter, the shift control configurations in the "linear shift mode", the "DSTEP shift mode", and the "manual shift mode" which are the simulated stepwise shift mode are explained. Besides, the "the simulated stepwise shift mode" is a generic term of the "linear shift mode", the "DSTEP shift mode", and the "manual shift mode".

(Shift Control Configuration in Linear Shift Mode)

FIG. 3 shows one example of an acceleration shift line produced when the "linear shift mode" (=the simulated stepwise shift mode) is selected in the CVT control unit 84 according to the first embodiment. Hereinafter, a shift control configuration in the "linear shift mode" is explained with reference to FIG. 3.

The "linear shift mode" is a mode to control the transmission gear ratio by producing the acceleration shift line at the depression of the accelerator which is indicative of the acceleration request of the driver. A shift control start condition of the "linear shift mode" is the high accelerator depression speed, and the depression by which the accelerator opening degree is greater than an R/L opening degree (road/load opening degree) by which the vehicle speed is maintained constant, by a predetermined value or more. The "linear shift mode" has following characteristics.

The acceleration shift line which can be used in any vehicle speed region is produced (FIG. 3). For example, when the accelerator is re-depressed at the vehicle speed Vb in the "continuous shift mode", the target primary rotation speed Npri* is immediately increased as shown by a broken line characteristic C of FIG. 3. Then, the vehicle speed VSP is increased along the shift line of the accelerator opening degree APO (for example, 4/8 opening degree) after the re-depression. That is, the downshift in the initial stage is large. Then, the upshift is immediately started. Accordingly, there is no increase feeling of the acceleration.

On the other hand, when the target primary rotation speed Npri* is increased to the predetermined target primary rotation speed in a case where the accelerator is re-depressed at the vehicle speed Vb in the "linear shift mode", the vehicle speed VSP is increased along an acceleration shift line which is increased right upward, and which is for maintaining the transmission gear ratio, as shown by a solid line characteristic B in FIG. 3. That is, the downshift in the initial stage is suppressed. Then, the transmission gear ratio is maintained. Accordingly, the acceleration feeling is improved. When the vehicle speed at the re-acceleration is a vehicle speed Va different from the vehicle speed Vb, an acceleration shift line is produced every time based on the vehicle speed Va, as shown in a solid line characteristic A of FIG. 3. In this way, in the "linear shift mode", the simulated stepwise shift characteristic is automatically set in accordance with the accelerator opening degree and the vehicle speed VSP (the automatic simulated stepwise shift mode).

Besides, a cancel condition of the linear shift control is when there is the rapid accelerator return operation, or when a predetermined time period is elapsed after the accelerator opening degree APO becomes equal to or smaller than the predetermined value.

(Shift Control Configuration in DSTEP Shift Mode)

FIG. 4 shows one example of a DSTEP shift line used when the "DSTEP shift mode" (=the simulated stepwise shift mode) is selected in the CVT control unit 84 according to the first embodiment. Hereinafter, a shift control configuration in the "DSTEP shift mode" is explained with reference to FIG. 4.

The "DSTEP shift mode" is an upshift mode in which the transmission gear ratio of the belt type continuously variable transmission 6 is stepwisely varied to simulate the stepwise shift. A shift control start condition of the "DSTEP shift mode" is that the accelerator opening degree APO is equal to or greater than a predetermined value (for example, 4/8 opening degree), and that a driving point by the vehicle speed VSP and the accelerator opening degree APO crosses the DSTEP shift line.

In the "DSTEP shift mode", as shown in FIG. 4, the DSTEP shift line (the stepwise shift line by a bold solid line) formed by reciprocating the target input rotation speed to simulate the stepwise shift is set at each accelerator opening degree, in an input rotation speed region which is sandwiched by an upshift shift judgment rotation speed and an upshift destination rotation speed (upshifted rotation speed). That is, the "DSTEP shift mode" is a mode in which the upshift is stepwisely performed by using the DSTEP shift line shown in FIG. 4 during the acceleration traveling in which the vehicle speed is increased in the high accelerator opening degree region.

As shown in FIG. 4, in the DSTEP shift line, the variation of the target primary rotation speed Npri* at the repetition of the upshift operation from the simulated first speed to the simulated sixth speed is represented as a corrugated characteristic. For example, when the primary rotation speed (=the transmission input rotation speed) in the simulated first speed reaches the upshift judgment rotation speed on the high rotation speed side, the primary rotation speed is decreased to upshift from the simulated first speed to the simulated second speed. When the primary rotation speed reaches the upshift destination rotation speed on the low rotation speed side, the transmission gear ratio is shifted to the next simulated second speed. The vehicle travels in a state where the transmission gear ratio is fixed to the simulated second speed. When the primary rotation speed (=the transmission input rotation speed) in the simulated second speed reaches the upshift judgment rotation speed on the high rotation speed side, the primary rotation speed is decreased to upshift from the simulated second speed to the simulated third speed. After this, the upshift operations are repeated until the simulated sixth speed. In this way, in the "DSTEP shift mode", the simulated stepwise shift characteristic is automatically set in accordance with the accelerator opening degree APO and the vehicle speed VSP (the automatic simulated stepwise shift mode).

(Shift Control Configuration in Manual Shift Mode)

FIG. 5 shows one example of a manual shift line used when the "manual shift mode" (=the simulated stepwise shift mode) is selected in the CVT control unit 84 according to the first embodiment. Hereinafter, a shift control configuration in the "manual shift mode" is explained with reference to FIG. 5.

The "manual shift mode" is a mode in which the transmission gear ratio is manually controlled by the selection of the driver. For example, in a case where the driver selects the manual shift mode, and performs a shift-up operation (switch (shift lever 96a) operation of the driver) or a shift-down operation (switch (shift lever 96a) operation of the driver), the shift stage (the fixed transmission gear ratio) is varied so that the transmission gear ratio is controlled to the transmission gear ratio corresponding to the selected shift stage. A shift control start condition of the "manual shift mode" is that the driver selects the shift stage by the operation of the shift lever 96a (for example, the switching from the D range to the M range (the manual shift mode)).

In the "manual shift mode", as shown in FIG. 5, the manual shift line from the first speed to the sixth speed is set in the transmission gear ratio region from the Lowest transmission gear ratio which can be attained by the belt type continuously variable transmission 6 to the Highest transmission gear ratio which can be attained by the belt type continuously variable transmission 6. A fixed transmission gear ratio is allocated (assigned) to each shift. In this way, in the "manual shift mode", the stepwise transmission gear ratio characteristic is set in accordance with the switch operation of the driver.

In this case, one of the simulated stepwise shift modes of the "linear shift mode", the "DSTEP shift mode", and the "manual shift mode" includes a non-shift state (in-gear state) in which the target primary rotation speed Npri* (the target input rotation speed) is increased without shifting the transmission gear ratio during the one of the simulated stepwise shift modes.

[Displayed Rotation Speed Control Process Configuration]

Figure 6:
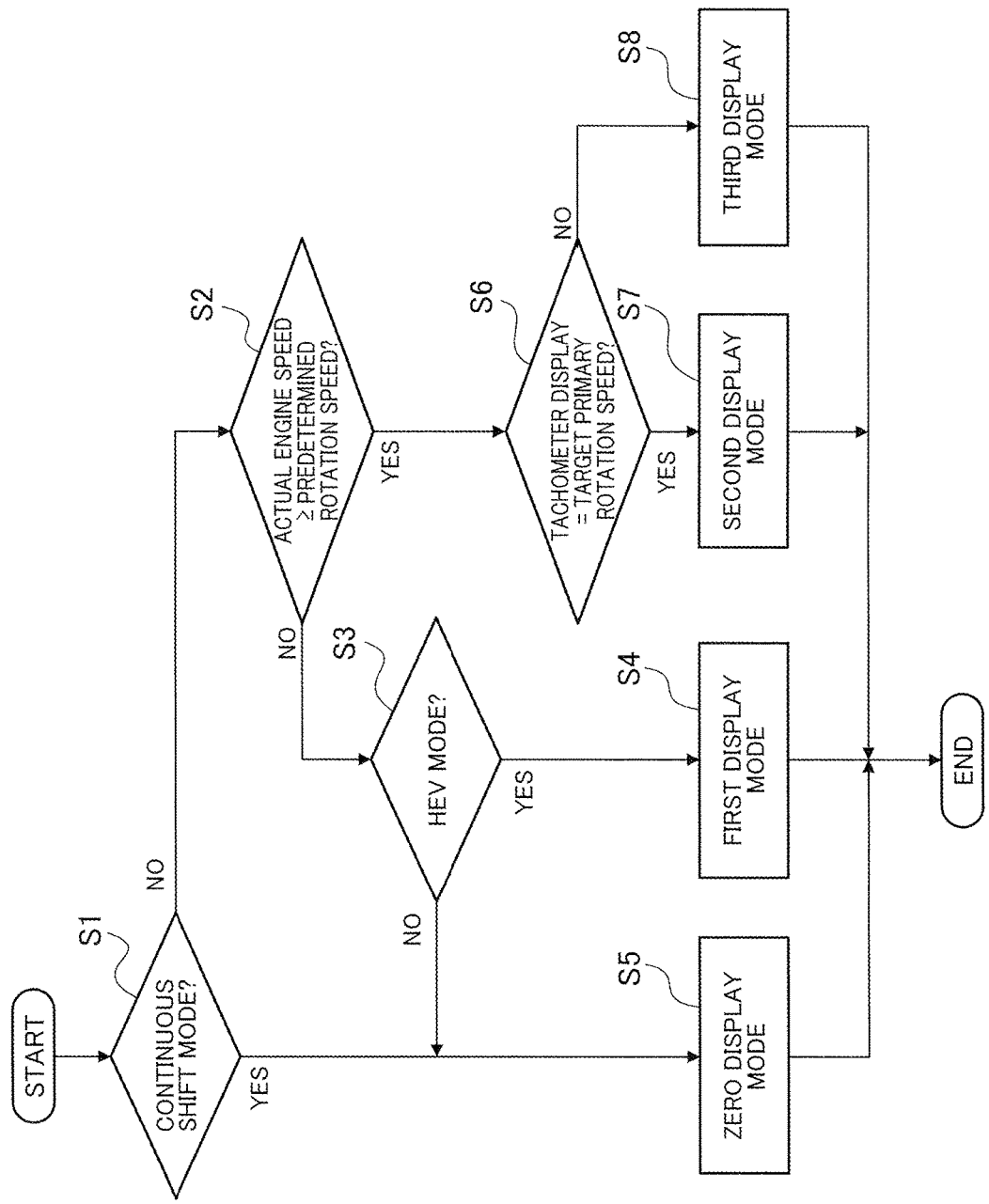
FIG. 6 is a flowchart showing a flow of a displayed rotation speed control operation performed in a display control unit 87 according to the first embodiment.

FIG. 6 shows a flow of the displayed rotation speed control process performed in the display control unit 87 according to the first embodiment (the displayed rotation speed controller). Hereinafter, steps of FIG. 6 which are indicative of the displayed rotation speed control process configuration are explained. Besides, this operation is repeatedly performed at each process time period (for example, 10 ms) during the traveling.

At step S1, it is judged whether or not the mode is the continuous shift mode by the judgment flag of each shift mode inputted from the CVT control unit 84. That is, it is judged whether it is a case where the shift control by the "continuous shift mode" is performed, or a case where the shift control by the shift mode of the "linear shift mode", the "DSTEP shift mode", or the "manual shift mode" which are the simulated stepwise shift mode is performed. In case of YES (DP meter non-actuation, the continuous shift mode), the process proceeds to step S5. In case of NO (DP meter actuation, the simulated stepwise shift mode), the process proceeds to step S2.

In this case, the "DP meter actuation" is that a performance control of the tachometer 102a is performed. A case where the shift control by the simulated stepwise shift mode is performed is the DP meter actuation. Moreover, the information such as the shift speed judgement, the target transmission gear ratio Dratio, the shift command value Ratio0, and so on are inputted from the CVT control unit 84, in addition to the judgment flag of each shift mode.

At step S2, subsequently to the judgment of the "simulated stepwise shift mode" at step S1, it is judged whether or not the actual engine speed from the actual engine speed sensor 92 is equal to or greater than a predetermined rotation speed. In case of YES (the actual engine speed the predetermined rotation speed), the process proceeds to step S6. In case of NO (the actual engine speed<the predetermined rotation speed), the process proceeds to step S3. In a case where the "HEV mode" is selected and the starting of the transverse engine 2 is initiated, "NO (the actual engine speed<the predetermined rotation speed)" is satisfied during a short time period.

In this case, in a case where the starting of the transverse engine 2 is initiated, "the predetermined rotation speed" is a rotation speed at which the actual engine speed of the transverse engine 2 becomes stable after the initiation of the starting. This is because the rotation of the transverse engine 2 is unstable during the short time period due to the cranking of the transverse engine 2, the engagement of the first clutch, and so on when the starting of the transverse engine 2 is initiated. Accordingly, the "predetermined rotation speed" is set to, for example, a rotation speed at which the transverse engine 2 performs self-sustaining operation, that is, an idling rotation speed (for example, 800 rpm).

At step S3, subsequently to the judgement of "the actual engine speed<the predetermined rotation speed" at step S2, it is judged whether or not the current driving mode of the hybrid vehicle (the "EV mode", the "HEV mode", or the "(HEV)WSC mode") inputted from the hybrid control module 81 is the HEV mode. That is, it is judged whether or not that driving mode is the HEV mode or the EV mode. In case of YES (the HEV mode), the process proceeds to step S4. In case of NO (the EV mode), the process proceeds to step S5. Moreover, in a case where there is the start/stop request (EV→HEV/HEV→EV switching request) of the transverse engine 2 inputted from the hybrid control module 81, following judgments are performed. "YES (the HEV mode)" is judged when that request is the engine start request (EV→HEV switching request) of the transverse engine 2. Moreover, "NO (the EV mode)" is judged when that request is the engine stop request (HEV→EV switching request) of the transverse engine 2.

In this case, "the case where there is the start request of (EV→HEV switching request) of the transverse engine 2" is a case where there is a driving force start request, or a case where there is a system start request. "The case where there is the driving force start request" is, for example, a case where the required driving force (the accelerator opening degree APO by the accelerator pedal operation of the driver, and so on) required by the driver is greater than an upper limit of the driving force which can be outputted by the motor generator 4. Moreover, even when the accelerator opening degree APO is constant, "the case where there is the driving force start request" is satisfied by the increase of the vehicle speed VSP. "The case where there is the system start request" is, for example, a case by a charge request to the high power battery 21 due to the decrease of the battery SOC, a case due to the decrease of the temperature of the coolant, and so on.

Furthermore, "there is the stop request (HEV→EV switching request) of the transverse engine 2" is a case where there is the driving force stop request, or a case where there is the system stop request. "The case where there is the driving force stop request" is a case where it is returned from a case where the required driving force required by the driver is greater than the upper limit of the driving force which can be outputted by the motor generator 4, to a case where the required driving force is returned to the driving force which can be outputted by the motor generator 4, contrary to the case where there is the driving force start request. This is determined in accordance with the vehicle speed VSP and the accelerator opening degree APO, and so on. "The case where there is the system stop request" is, for example, a case where the charge to the high power battery 21 is not needed, a case due to the increase of the tempera-ture of the coolant, a case where the fuel of the transverse engine 2 is eliminated, and so on contrary to the case where there is the system start request.

At step S4, subsequently to the judgment of "the HEV mode, or there is the engine start request (EV→HEV switching request) at step S3, a first engine speed is displayed in the tachometer 102a in the non-actuation of the DP meter (the first display mode). The process proceeds to an end.

In this case, in the "first display mode", a retarded (delayed) displayed (display) rotation speed signal which is displayed by retarding (smoothing) the actual engine speed is produced. This signal is produced by retarding (delaying) the actual engine speed, for example, by using a filter. Then, that signal is displayed as the first engine speed (first driving source rotation speed) in the tachometer 102a.

At step S5, subsequently to the judgment of the "continuous shift mode" at step S1, or the judgment of "the EV mode, or there is the engine stop request (HEV→EV switching request", the tachometer is brought to the DP meter non-actuation (zero display mode). The process proceeds to the end.

In this case, the "zero display mode" is a mode in which the actual engine speed is directly displayed. When the actual engine speed is zero, the displayed rotation speed signal is not produced. Accordingly, the display of the tachometer 102a is zero. However, when the actual engine speed is not zero (the case of "the continuous shift mode", or the case of "there is the engine stop request"), an actual engine displayed (display) rotation speed signal is produced based on the actual engine speed. Then, that signal is displayed as the actual engine speed in the tachometer 102a. With this, in the case where there is the engine stop request (HEV→EV switching request), the display of the tachometer 102a becomes smaller as the time elapses. Consequently, the display of the tachometer 102a becomes zero.

At step S6, subsequently to the judgement of "the actual engine speed the predetermined rotation speed" at step S2, it is judged whether or not the engine speed displayed in the tachometer 102a is equal to the target primary rotation speed Npri* inputted from the hybrid control module 81. In case of YES (the tachometer display=the target primary rotation speed Npri*), the process proceeds to step S7. In case of NO (the tachometer display≠ the target primary rotation speed Npri*), the process proceeds to step S8.

In this case, the information such as the shift target rotation speed NPREQ is inputted from the hybrid control module 81, in addition to the target primary rotation speed Npri*.

At step S7, subsequently to the judgment of "the tachometer display=the target primary rotation speed Npri*" at step S6, a second engine speed is displayed in the tachometer 102a in the DP meter actuation (second display mode). The process proceeds to the end.

In this case, in "the second display mode", firstly, a target primary displayed (display) rotation speed signal is produced based on the target primary rotation speed Npri* according to the target transmission gear ratio Dratio stepwisely set. Then, that signal is displayed as the second engine speed (second driving source rotation speed) in the tachometer 102a.

At step S8, subsequently to the judgment of "the tachometer display ≠ the target primary rotation speed Npri*" at step S6, a third engine speed (third driving source rotation speed) is displayed in the tachometer 102a in the DP meter actuation (third display mode). The process proceeds to the end.

In this case, firstly, when the actual engine speed becomes equal to or greater than a predetermined rotation speed, "the third display mode" produces a transition displayed (display) rotation speed signal to transit from the first engine speed displayed in the first display mode at that time (at the transition), to the second engine speed displayed in the second display mode during a predetermined transition time period (for example, 250 ms). Then, that signal is displayed as the third engine speed (third driving source rotation speed) in the tachometer 102a.

The production of that transition displayed rotation speed signal is explained. Firstly, a difference between the first engine speed displayed in the first display mode, and the second engine speed displayed in the second display mode, during the predetermined transition time period is calculated. Next, an inclination a characteristic of the transition displayed rotation speed signal to transit from the first engine speed to the second engine speed is calculated from that difference and the predetermined transition time period to correspond to the end of the predetermined transition time period. Next, the transition displayed rotation speed signal produced based on that inclination a characteristic is displayed as the third engine speed in the tachometer 102a.

Besides, "the predetermined transition time period" is previously set by sensitivity experiment and so on. For example, at the sudden transition from the first engine speed to the second engine speed, the driver judges that the transverse engine 2, the tachometer 102a, and so on is malfunctioned. Accordingly, the transition time period by which the driver does not think the malfunction (failure) is previously set by the sensitivity experiment and so on. This predetermined transition time period is constant in a case where the differences between the first engine speed and the second engine speed are different.

Next, operations are explained.

The operations of the displayed rotation speed control apparatus of the FF hybrid vehicle according to the first embodiment is explained about "displayed rotation speed control process operation", "characteristic operation of displayed rotation speed control", and "other characteristic operations in displayed rotation speed control".

[Displayed Rotation Speed Control Process Operation]

Hereinafter, the displayed rotation speed control process operation is explained based on the flowchart of FIG. 6.

Firstly, when it is judged that the shift control by "the continuous shift mode" is performed (the DP meter non-actuation) during the traveling of the vehicle, the process proceeds along step S1→step S5→the end in the flowchart of FIG. 6. Moreover, when the shift control by the "simulated stepwise shift mode" is performed during the traveling of the vehicle, when the actual engine speed is smaller than the predetermined rotation speed, and when the EV mode is judged or it is judged that there is the engine stop request (HEV→EV switching request), the process proceeds along step S1→step S2→step S3→step S5→the end in the flowchart of FIG. 6. Then, when the actual engine speed is zero (for example, the EV mode), zero is displayed in the tachometer 102a. Moreover, when the actual engine speed is not zero (for example, there is the engine stop request (HEV→EV switching request), the actual engine displayed rotation speed signal is displayed as the actual engine speed in the tachometer 102a. The display of the tachometer 102a becomes smaller with the time (as the time elapses), and becomes zero.

Next, it is judged that the shift control by "the simulated stepwise shift mode" is performed (the DP meter actuation) during the traveling of the vehicle, the process proceeds along step S1→step S2 in the flowchart of FIG. 6. At step S2, it is judged whether or not the actual engine speed is equal to or greater than the predetermined rotation speed.

However, in a case where the shift mode is switched from "the continuous shift mode" to "the simulated stepwise shift mode", in a case where the driving mode of the hybrid vehicle is selected to the "HEV mode" so that the starting of the transverse engine 2 is initiated, the actual engine speed becomes smaller than the predetermined rotation speed during the short time period. Accordingly, while it is judged that the actual engine speed is smaller than the predetermined rotation speed, the process proceeds from step S2 to step S3 in the flowchart of FIG. 6. In this case, at step S3, the HEV mode is judged, or it is judged that there is the engine start request (EV→HEV switching request). Accordingly, the process proceeds along step S3→step S4→the end in the flowchart of FIG. 6. Consequently, the retarded displayed rotation speed signal is displayed as the first engine rotation speed in the tachometer 102a (the first display mode). Besides, while it is judged that the actual engine speed is smaller than the predetermined rotation speed at step S2, the process repeats a flow of step S1→step S2→step S3→step S4→the end in the flowchart of FIG. 6.

Then, when it is judged that the actual engine speed is equal to or greater than the predetermined rotation speed at step S2, the process proceeds from step S2 to step S6 in the flowchart of FIG. 6. At step S6, it is judged whether or not the engine speed displayed in the tachometer 102a is equal to the target primary rotation speed Npri*.

Then, when it is judged that the engine speed displayed in the tachometer 102a is equal to the target primary rotation speed Npri* at step S6, the process proceeds along step S6→step S7→the end in the flowchart of FIG. 6. Then, the target primary displayed rotation speed signal is displayed as the second engine speed in the tachometer 102a (the second display mode).

However, when it is judged that the engine speed displayed in the tachometer 102a is not equal to the target primary rotation speed Npri* at step S6, the process proceeds along step S6→step S8→the end in the flowchart of FIG. 6. Then, the transition displayed rotation signal produced based on the inclination a characteristic is displayed as the third engine speed in the tachometer 102a (the third display mode). Besides, while it is judged that the engine speed displayed in the tachometer 102a is not equal to the target primary rotation speed Npri* at step S6, the process repeats a flow of step S1→step S2→step S6→step S8→the end in the flowchart of FIG. 6.

This flow is a next process after it is judged that the actual engine speed is smaller than the predetermined rotation speed at step S2, so as to proceed from step S2 to step S6. That is, this flow is a next process after the first engine speed is displayed in the tachometer 102a in the first display mode, so as to proceed from step S2 to step S6. Accordingly, the requirement of step S6 is not satisfied during the short time period. Consequently, the process proceeds from step S6 to step S8 in the flowchart of FIG. 6. The third engine speed is displayed in the tachometer 102a in the third display mode. When the requirement of step S6 is satisfied (the tachometer display=the target primary rotation speed Npri*) at the subsequent process, it is shifted from the third engine speed (the third display mode) to the second engine speed (the second display mode). The process proceeds from step S6 to step S7 in the flowchart of FIG. 6.

Figure 7:
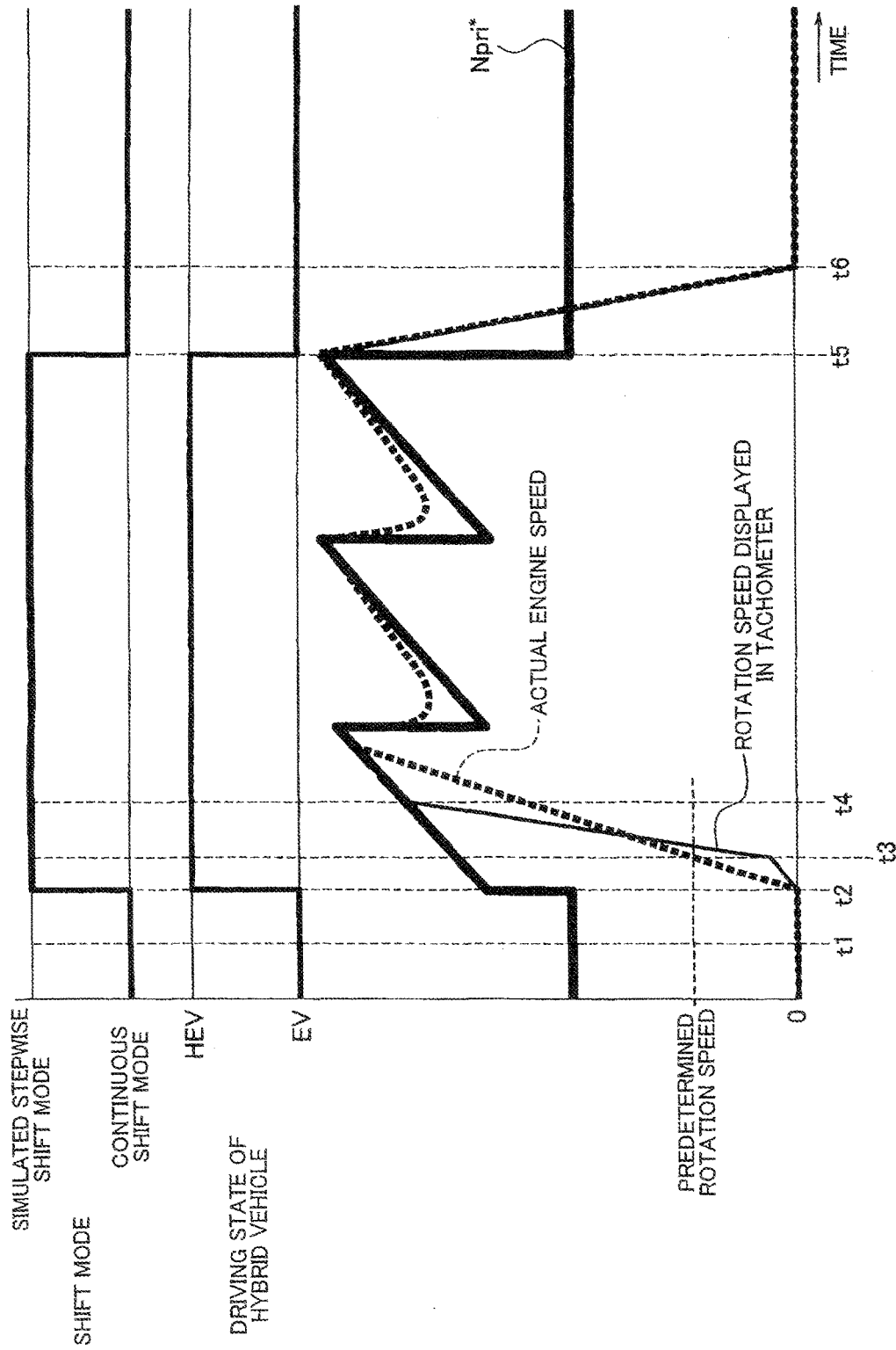
FIG. 7 is a time chart showing characteristics of a shift mode, a driving mode of the hybrid vehicle, a target primary rotation speed Npri*, an actual engine speed, and an engine speed displayed in a tachometer, at switching of shift modes and driving modes of the hybrid vehicle in the FF hybrid vehicle according to the first embodiment.
Figure 8:
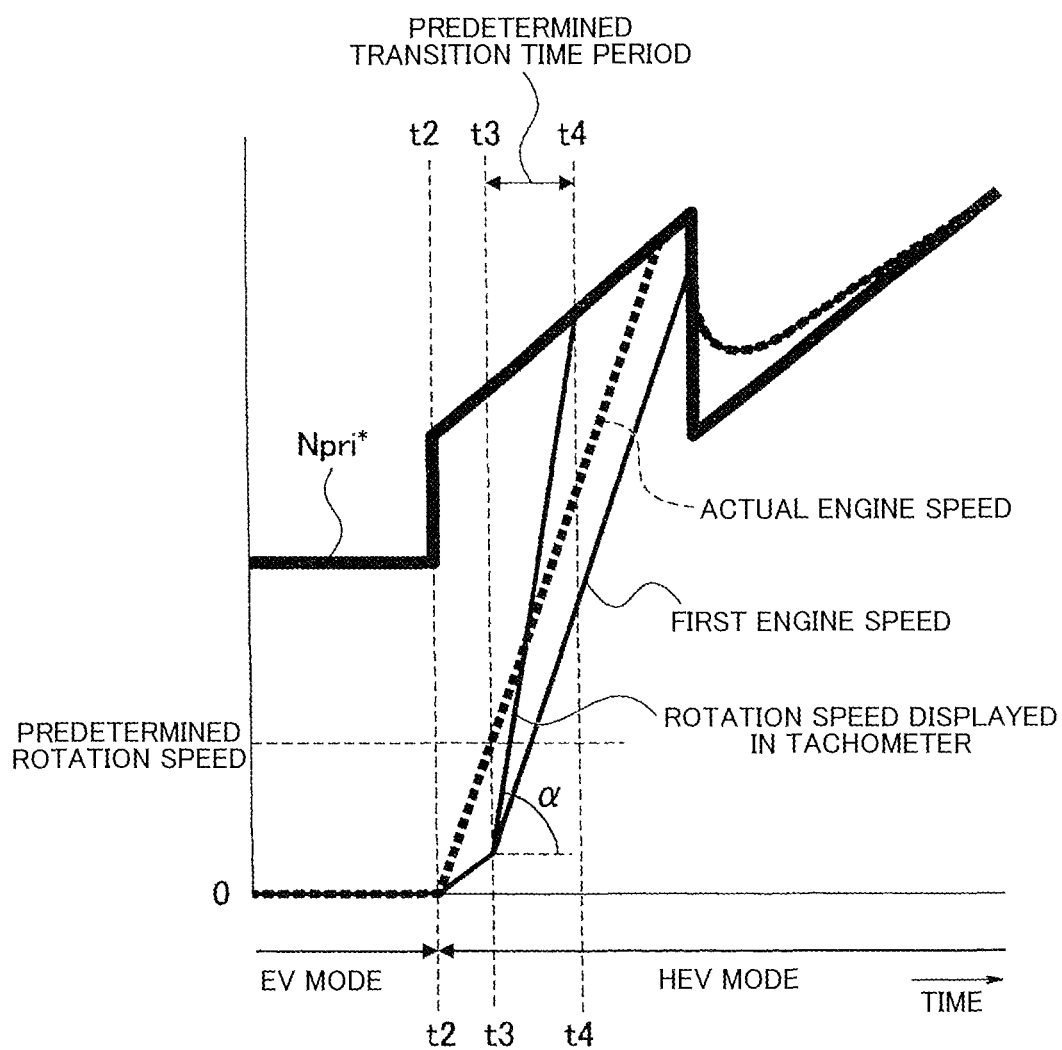
FIG. 8 is a time chart showing characteristics of the target primary rotation speed Npri*, the actual engine speed, the engine speed displayed in the tachometer, and the first engine speed, at switching of shift modes and driving modes of the hybrid vehicle in the FF hybrid vehicle according to the first embodiment, and showing details from time t2 to time t4 in FIG. 7.

Next, each time is explained based on the operation example shown in time charts of FIG. 7 and FIG. 8. Hereinafter, the steps of the displayed rotation speed control operation configuration are explained based on the time charts of FIG. 7 and FIG. 8. Besides, FIG. 8 shows details from time t2 to time t4 in FIG. 7.

As shown in FIG. 7, at time t1, it is the DP meter non-actuation (the continuous shift mode). The hybrid vehicle travels in the EV mode of the driving mode. Moreover, there is no start request (EV→HEV switching request) of the transverse engine 2. Furthermore, the actual engine speed (broken line) is zero.

At this time t1, the display control unit 87 does not produce the displayed rotation speed signal since the actual engine speed is zero. Accordingly, zero is displayed in the tachometer 102a (solid line). This time t1 corresponds to the flow of step S1→step→S5 the end in the flowchart of FIG. 6.

In a period from time t1 to time t2, the display control unit 87 does not produce the displayed rotation speed signal since this period is identical to time t1, as shown in FIG. 7. Accordingly, zero is displayed in the tachometer 102a. Moreover, this period from the time t1 to time t2 corresponds to the repetition of the flow of step S1→step S5→the end. Besides, in a period from a time before time t1 to time t2, the vehicle is in the constant speed traveling in the EV mode.

In a case where there is the accelerator depression operation of the driver at time t2, the HEV mode is selected as the driving mode of the hybrid vehicle as shown in FIG. 7. The shift mode is switched from the continuous shift mode to the simulated stepwise shift mode (for example, the DSTEP shift mode), the DP meter is switched from the non-actuation to the actuation. Accordingly, at this time t2, it is judged that the actual engine speed is smaller than the predetermined rotation speed (zero). Moreover, it is judged that there is the engine start request (EV→HEV switching request). Furthermore, the starting of the stopped transverse engine 2 is initiated. Besides, the target primary rotation speed Npri* is immediately increased. Then, in a period from time t2 to time t5, the upshift operation by the simulated stepwise shift mode is repeated as shown in FIG. 7. Moreover, in the period from time t2 to time t5, the shift mode is the simulated stepwise shift mode as shown in FIG. 7. The hybrid vehicle is traveled in the HEV mode of the driving mode. Accordingly, this explanation is omitted from time t2 to time t5. At this time t2, the display control unit 87 produces the retarded displayed rotation speed signal. Then, that signal is displayed as the first engine speed in the tachometer 102a (the first display mode). This time t2 corresponds to the flow of step S1→step S2→step S3→step S4→the end in the flowchart of FIG. 6.

In the period from time t2 to time t3, it is judged that the actual engine speed is smaller than the predetermined rotation speed as shown in FIG. 8. In this period from time t2 to time t3, the display control unit 87 produces the retarded displayed rotation speed signal. That signal is displayed as the first engine speed in the tachometer 102a (the first display mode). The period from time t2 to time t3 corresponds to the repetition of the flow of step S1→step S2→step S3→step S4→the end in the flowchart of FIG. 6.

At time t3, it is judged that the actual engine speed is equal to or greater than the predetermined rotation speed as shown in FIG. 8. Moreover, at time t3, it is judged that the engine speed displayed in the tachometer 102a is not equal to the target primary rotation speed Npri* (the solid line). At this time t3, the display control unit 87 produces the inclination a characteristic of the transition displayed rotation speed signal which is transited from the first engine speed displayed in the first display mode to the second engine speed displayed in the second display mode during the predetermined transition time period. The transition displayed rotation speed signal produced based on that inclination a characteristic is displayed as the third engine rotation speed in the tachometer 102a (the third display mode). This time t3 corresponds to a flow of step S1→step S2→step S6→step S8→the end in the flowchart of FIG. 6.

In a period from time t3 to time t4, the actual engine speed is equal to or greater than the predetermined rotation speed, and further increased. Moreover, in the period from time t3 to time t4, it is also judged that the engine speed displayed in the tachometer 102a is not equal to the target primary rotation speed Npri*, as shown in FIG. 8. Besides, the period from time t3 to time t4 is a transition period during which it is transited from the first engine speed (the first display mode) to the second engine speed (the second display mode). The period from time t3 to time t4 corresponds to the predetermined transition time period. In this period from time t3 to time t4, the transition displayed rotation speed signal produced based on the inclination a characteristic is displayed as the third engine speed in the tachometer 102a by the display control unit 87. The engine speed displayed in the tachometer 102a becomes large (the third display mode). This period from time t3 to time t4 corresponds to the repeat of the flow of step S1→step S2→step S6→step S8→the end in the flowchart of FIG. 6.

At time t4, the actual engine speed is equal to or greater than the predetermined rotation speed, as shown in FIG. 8. Moreover, it is judged that the engine speed displayed in the tachometer 102a is equal to the target primary rotation speed Npri*. At this time t4, the display control unit 87 is shifted from the first engine speed (the first display mode) through the third engine speed (the third display mode) to the second engine speed (the second display mode). That is, the display control unit 87 produces the target primary displayed rotation speed signal. That signal is displayed as the second engine speed in the tachometer 102a (the second display mode). This time t4 corresponds to the flow of step S1→step S2→step S6→step S7→the end in the flowchart of FIG. 6.

In a period from time t4 to time t5, the actual engine speed is equal to or greater than the predetermined rotation speed, as shown in FIG. 7. Moreover, in this period, the engine speed displayed in the tachometer 102a, and the target primary rotation speed Npri* are superimposed in FIG. 7. Accordingly, it is judged that the engine speed displayed in the tachometer 102a is equal to the target primary rotation speed Npri*. Besides, in this period, the motion of the rotation speed of the actual engine speed is gentle relative to that of the target primary rotation speed Npri*, as shown in FIG. 7. A part of the actual engine speed is superimposed on the target primary rotation speed Npri*. In the period from time t4 to time t5, the display control unit 87 produces the target primary displayed rotation speed signal. That signal is displayed as the second engine speed in the tachometer 102a (the second display mode). This period from time t4 to time t5 corresponds to the repeat of the flow of step S1→step S2→step S6→step S7→the end in the flowchart of FIG. 6.

At time t5, the shift mode is switched from the simulated stepwise shift mode to the continuous shift mode, as shown in FIG. 7. The DP meter is switched from the actuation to the non-actuation. Moreover, the driving mode of the hybrid vehicle is switched from the HEV mode to the EV mode. Accordingly, it is judged that there is the engine stop request (HEV→EV switching request). The transverse engine 2 is stopped. Furthermore, the actual engine speed is not zero. Besides, the target primary rotation speed Npri* is immediately decreased. At this time t5, the display control unit 87 produces the actual engine displayed rotation speed signal based on the actual engine speed since the actual engine speed is not zero. Then, that signal is displayed as the actual engine speed in the tachometer 102a. This time t5 corresponds to a flow of step S1→step S5→the end in the flowchart of FIG. 6.

In a period from time t5 to time t6, the DP meter is not actuated (the continuous shift mode), as shown in FIG. 7. The hybrid vehicle travels in the EV mode of the driving mode. Moreover, there is no start request (EV→HEV switching request) of the transverse engine 2. Moreover, the actual engine speed is not zero. In this period from time t5 to time t6, the display control unit 87 produces the actual engine displayed rotation speed signal based on the actual engine speed since the actual engine speed is not zero. That signal is displayed as the actual engine rotation speed in the tachometer 102a. With this, the display of the tachometer 102a becomes smaller with elapsed time to be closer to zero. The period from time t5 to time t6 corresponds to the repetition of the flow of step S1→step S5→the end in the flowchart of FIG. 6.

Time t6 is identical to time t1 except that the display of the tachometer 102a which becomes smaller from time t5 becomes zero. Accordingly, the explanations are omitted. Moreover, times after time t6 are identical to the period from time t1 to time t2. Accordingly, the explanations are omitted.

[Characteristic Operation of Displayed Rotation Speed Control]

For example, a comparative example is a conventional control apparatus for a vehicle in which a displayed rotation speed signal obtained by suppressing a detection signal of an engine speed is displayed in the tachometer. In this control apparatus for the vehicle in the comparative example, at the variation of the engine speed, the displayed rotation speed signal is obtained by suppressing the variation of the detection signal of the engine speed when the engine speed is equal to or greater than the predetermined rotation speed. At the variation of the engine speed, the displayed rotation speed signal is obtained without suppressing the variation when the engine speed is smaller than the predetermined rotation speed.

However, in the control apparatus for the vehicle in the comparative example, a hybrid vehicle includes the engine and the traveling motor which are the driving sources, and a continuously variable transmission disposed between the traveling motor and the driving wheels. In a case where that continuously variable transmission has the simulated stepwise shift mode in which the transmission gear ratio is stepwisely varied by setting the target input rotation speed (the target primary rotation speed Npri*) to repeat the gradual increase and the sudden decrease of the transmission input rotation speed during the acceleration, the unnatural feeling of the rotation speed display may be provided to the driver due to the engine speed displayed in the tachometer in the simulated stepwise shift mode.

On the other hand, in the first embodiment, the display control unit 87 displays the target primary rotation speed Npri* as the driving source rotation speed in the tachometer 102a in the simulated stepwise shift mode ("NO" at step S1 of FIG. 6).

That is, in the simulated stepwise shift mode, the target primary rotation speed Npri* indicative of the direct stepwise shift feeling is displayed as the driving source rotation speed in the tachometer 102a. Accordingly, in the simulated stepwise shift mode, the unnatural feeling of the rotation speed display to the driver is decreased (relieved) relative to a case where the value retarded from the actual engine speed, and the actual engine speed is displayed.

Accordingly, it is possible to decrease the unnatural feeling of the rotation speed display to the driver in the simulated stepwise shift mode.

Moreover, in the first embodiment, when the mode is switched from the EV mode to the HEV mode to initiate the starting of the transverse engine, and when the mode is switched from the continuous shift mode to the simulated stepwise shift mode while the actual engine speed is smaller than the predetermined rotation speed, the display control unit 87 displays the value obtained by retarding (delaying) the actual engine speed during a period from the initiation of the starting of the transverse engine 2 to the rotation speed smaller than the predetermined rotation speed (step S1→step S2→step S3→step S4 in FIG. 6, time t2 to time t3 in FIG. 7 and FIG. 8).

That is, even when the mode is switched to the simulated stepwise shift mode, the actual engine rotation speed which is unstable at the initiation of the starting of the transverse engine 2 is displayed in the tachometer 102a by retarding the actual engine speed. Accordingly, the unstable rotation speed at the initiation of the starting of the transverse engine 2 is displayed in the tachometer 102a in the stable state.

Accordingly, when the mode is switched from the continuous shift mode to the simulated stepwise shift mode, it is possible to decrease the unnatural feeling of the rotation speed display to the driver during a period from the initiation of the starting of the engine, to the rotation speed smaller than the predetermined rotation speed.

[Other Characteristic Operation of Display Rotation Speed Control]

In the first embodiment, when the transverse engine 2 is started during the traveling, the display control unit 87 produces the retarded displayed rotation speed signal displayed by retarding the actual engine speed.

Then, this signal is displayed as the first engine speed which is the first driving source rotation speed, in the tachometer 102a (the first display mode) (step S1→step S2→step S3→step S4 in FIG. 6, and time t2 to time t3 in FIG. 7 and FIG. 8).

That is, when the transverse engine 2 is started during the traveling, the first engine speed which is the first driving source rotation speed, and which is retarded relative to the actual rotation speed is displayed in the tachometer 102a. Accordingly, the unnatural feeling of the rotation speed display to the driver is decreased.

Moreover, in the first embodiment, the display control unit 87 produces the target primary displayed rotation speed signal based on the target primary rotation speed Npri* according to the target transmission gear ratio stepwisely set, in the simulated stepwise shift mode. Then, that signal is displayed as the second engine speed which is the second driving source rotation speed, in the tachometer 102a (the second display mode) (the flow of step S1→step S2→step S6→step S7, and time t4 to time t5 in FIG. 7 and FIG. 8).

That is, in the simulated stepwise shift mode, the second engine speed which is the second driving source rotation speed, and which accords to the target transmission gear ratio indicative of the direct stepwise shift feeling is displayed in the tachometer 102a. Accordingly, in the simulated stepwise shift mode, the unnatural feeling of the rotation speed display to the driver is decreased, relative to a case where the value retarded from the actual engine speed, and the actual engine speed are displayed.

Moreover, in the first embodiment, when that actual engine speed becomes equal to or greater than the predetermined rotation speed, the display control unit 87 produces the transition displayed rotation speed signal which is transited from the first engine speed to the second engine speed during the predetermined transition time period. That signal is displayed as the third engine speed which is the third driving source rotation speed in the tachometer 102a (the third display mode) (step S1→step S2→step S6→step S8 in FIG. 6, and time t3 to t4 in FIG. 7 and FIG. 8).

That is, the third engine speed is displayed in the tachometer 102a, at the transition from the first engine speed to the second engine speed when the actual engine speed becomes equal to or greater than the predetermined rotation speed.

Accordingly, it is possible to decrease the unnatural feeling of the rotation speed display to the driver, at the transition from the first engine speed to the second engine speed when the actual engine speed becomes equal to or greater than the predetermined rotation speed.

Moreover, in the first embodiment, in the third display mode, the difference between the first engine speed and the second engine speed is calculated during the predetermined transition time period (times t3 to t4 in FIG. 7 and FIG. 8). The inclination a characteristic of the transition displayed rotation speed signal which is shifted from the first engine speed to the second engine speed is produced by that difference and the predetermined transition time period to correspond to the end of the predetermined transition time period. Then, the third engine speed based on the inclination a characteristic is displayed in the tachometer 102a, during the predetermined transition time period (times t3 to t4 of FIG. 7 and FIG.8) (step S1→step S2→step S6→step S8, and times t3 to t4 in FIG. 7 and FIG. 8).

That is, when the actual engine speed becomes equal to or greater than the predetermined speed, the third display mode increases the engine speed displayed in the tachometer 102a based on the inclination a characteristic (the repetition of the flow of step S1→step S2→step S6→step S8→the end, times t3 to t4 in FIG. 7 and FIG. 8). With this, it becomes the second engine speed to correspond to the end of the predetermined transition time period.

Accordingly, at the transition from the first engine speed to the second engine speed, the transition is performed by the inclination a characteristic. Accordingly, it is possible to decrease the unnatural feeling of the rotation speed display to the driver at the transition, relative to the transition by the stepwise characteristic.

In the first embodiment, the CVT control unit 84 is configured to perform the switching control from the continuous shift mode to the simulated stepwise shift mode (for example, the linear shift mode in FIG. 3 and the DSTEP shift mode in FIG. 4) when the accelerator opening degree APO becomes the predetermined accelerator opening degree (for example, 4/8 opening degree).

That is, it is possible to switch the shift mode from the continuous shift mode to the simulated stepwise shift mode in accordance with the accelerator opening degree APO which is the acceleration intention of the driver.

Accordingly, the shift mode is switched in accordance with the acceleration intention of the driver. Consequently, it is possible to provide the acceleration feeling intended by the driver.

In the first embodiment, when the shift lever 96a is switched from the continuous shift mode to the simulated shift mode (for example, the manual shift mode in FIG. 5), the CVT control unit 84 is configured to perform a switching control from the continuous shift mode to the manual shift mode. That is, the shift mode is switched from the continuous shift mode to the simulated stepwise shift mode by the intention of the driver. Moreover, it is also possible to switch the shift mode from the simulated stepwise shift mode to the continuous shift mode by the intention of the driver.

Accordingly, it is possible to attain the traveling intended by the driver since it is possible to switch the shift mode by the intention of the driver.

In the first embodiment, the simulated stepwise shift mode (for example, the linear shift mode in FIG. 3, and the DSTEP shift mode in FIG. 4) is an automatic simulated stepwise shift mode in which the simulated stepwise shift characteristic is automatically set in accordance with the accelerator opening degree APO and the vehicle speed VSP.

Accordingly, the upshift by the simulated stepwise shift mode is automatically performed to follow the acceleration intention of the driver. Consequently, it is possible to provide the acceleration feeling intended by the driver. Moreover, the simulated stepwise shift characteristic is automatically set, so that the special operation by the driver is not needed.

In this first embodiment, the simulated stepwise shift mode is the manual shift mode (FIG. 5) in which the stepwise transmission gear ratio characteristic is set in accordance with the switch operation of the driver (the shift-up operation and the shift-down operation by the shift lever 96a).

Accordingly, the upshift and the downshift are performed by the intention of the driver. Consequently, it is possible to provide the acceleration feeling intended by the driver.

Next, effects are explained.

In the display rotation speed control apparatus for the FF hybrid vehicle according to the first embodiment, the following effects can be obtained.

(1) A displayed rotation speed control apparatus for a hybrid vehicle including an engine (transverse engine 2) and a traveling motor (motor generator 4) which are driving sources, and a continuously variable transmission (belt type continuously variable transmission 6) disposed between the traveling motor and driving wheels (left and right front wheels 10R and 10L), the hybrid vehicle having an EV mode in which the traveling motor is used as the driving source, an HEV mode in which the engine (transverse engine 2) and the traveling motor (motor generator 4) are used as the driving sources, a continuous shift mode in which a transmission gear ratio of the continuously variable transmission (belt type continuously variable transmission 6) is continuously varied, and a simulated stepwise shift mode in which the transmission gear ratio of the continuously variable transmission (belt type continuously variable transmission 6) is stepwisely varied, the displayed rotation speed control apparatus including:

a displayed rotation speed controller (display control unit 87) configured to produce a displayed rotation speed signal to a rotation speed display device (tachometer 102a) disposed within a vehicle interior, the displayed rotation speed controller (display control unit 87) having a display mode in which a target primary rotation speed Npri* stepwisely set is displayed as a driving source rotation speed in the rotation speed display device (tachometer 102a) in the simulated stepwise shift mode ("linear shift mode", "DSTEP shift mode", and "manual shift mode"), when the mode is switched from the EV mode to the HEV mode to initiate a starting of the engine (transverse engine 2), and when the mode is switched from the continuous shift mode to the simulated stepwise shift mode ("linear shift mode", "DSTEP shift mode", and "manual shift mode") while an actual engine speed is smaller than a predetermined rotation speed, the displayed rotation speed controller being configured to display a value obtained by retarding the actual engine speed, during a period from the initiation of the starting of the engine (transverse engine 2) to a rotation speed smaller than a predetermined rotation speed (FIG. 6 to FIG. 8).

Accordingly, in the simulated stepwise shift mode (the "linear shift mode", the "DSTEP shift mode", and the "manual shift mode"), it is possible to decrease the unnatural feeling of the rotation speed display to the driver.

(2) The displayed rotation speed controller (display control unit 87) includes a first display mode, a second display mode, and a third display mode;

when the engine (transverse engine 2) is started during a traveling, the first display mode is configured to produce a retarded displayed rotation speed signal for displaying by retarding the actual engine speed, and to display the retarded displayed rotation speed as a first engine speed which is a first driving source rotation speed in the rotation speed display device (tachometer 102*a*);

in the simulated stepwise shift mode ("linear shift mode", "DSTEP shift mode", and "manual shift mode"), the second display mode is configured to produce a target primary displayed rotation speed signal based on a target primary rotation speed Npri* according to a target transmission gear ratio stepwisely set, and to display the target primary displayed rotation speed signal as a second engine speed which is a second driving source rotation speed in the rotation speed display device (tachometer 102*a*); and when the actual engine speed becomes equal to or greater than the predetermined rotation speed, the third display mode is configured to produce a transition displayed rotation speed signal which is transited from the first engine speed at that time to the second rotation speed during a predetermined transition time period, and to display the transition displayed rotation speed signal as a third engine speed which is a third driving source rotation speed in the rotation speed display device (tachometer 102*a*) (FIG. 6 to FIG. 8).

Accordingly, it is possible to decrease the unnatural feeling of the rotation speed display to the driver, at the transition from the first engine speed to the second engine speed when the actual engine speed becomes equal to or greater than the predetermined rotation speed, in addition to the effect of (1).

(3) The third display mode is configured to calculate a difference between the first engine speed and the second engine speed during the predetermined transition time period, to produce an inclination a characteristic of the transition displayed rotation speed signal transited from the first engine speed to the second engine speed to correspond to an end of the predetermined transition time period, from the difference and the predetermined transition time period, and to display the third engine speed based on the inclination a characteristic in the rotation speed display device (tachometer 102*a*) (FIG. 6 to FIG. 8).

Accordingly, the transition from the first engine speed to the second engine speed is performed by the inclination a characteristic. Consequently, it is possible to decrease the unnatural feeing of the rotation speed display to the driver at the transition, relative to a case where the transition is performed by the stepwise characteristic, in addition to the effect of (2).

(4) The shift mode switching controller (CVT control unit 84) is configured to perform a switching control from the continuous shift mode to the simulated stepwise shift mode (for example, the linear shift mode of FIG. 3, or the DSTEP shift mode of FIG. 4) when an accelerator opening degree APO becomes equal to or greater than a predetermined accelerator opening degree (FIG. 4).

Accordingly, it is possible to switch the shift mode to follow the acceleration intention of the driver, and thereby to provide the acceleration feeling intended by the driver, in addition to the effects of (1) to (3).

(5) The displayed rotation speed control apparatus includes a shift mode switching switch (shift lever 96*a*) arranged to be operated by a driver; and the shift mode switching controller (CVT control unit 84) is configured to perform a switching control from the continuous shift mode to the simulated stepwise shift mode (for example, the manual shift mode of FIG. 5) when the driver switches the shift mode switching switch from the continuous shift mode to the simulated stepwise shift mode (FIG. 5).

Accordingly, it is possible to switch the shift mode by the intention of the driver, and thereby to attain the traveling intended by the driver, in addition to the effects of (1) to (4).

(6) The simulated stepwise shift mode (for example, the linear shift mode of FIG. 3, or the DSTEP shift mode of FIG. 4) is an automatic simulated stepwise shift mode in which a simulated stepwise shift characteristic is automatically set in accordance with an accelerator opening degree APO and a vehicle speed VSP (FIG. 3 and FIG. 4).

Accordingly, the upshift by the simulated stepwise shift mode (for example, the linear shift mode in FIG. 3, and the DSTEP shift mode in FIG. 4) is automatically performed. Accordingly, it is possible to provide the acceleration feeling intended by the driver, in addition to the effects of (1) to (5).

(7) The simulated stepwise shift mode is a manual shift mode in which a stepwise shift characteristic is automatically set in accordance with a switch operation (the shift-up operation and the shift-down operation by the shift lever 96*a*) by a driver (FIG. 5).

Accordingly, the upshift and the downshift are performed by the intention of the driver. Consequently, it is possible to provide the acceleration feeling intended by the driver, in addition to the effects of (1) to (5).

Hereinabove, the displayed rotation speed control apparatus for the vehicle according to the present invention is explained based on the first embodiment. However, concrete structures are not limited to this first embodiment. Design variations, additions, and so on are permitted as long as it is not deviated from the gist of the present invention according to the claims.

In the first embodiment, the continuously variable transmission is the belt type continuously variable transmission 6. However, the continuously variable transmission may be, for example, a toroidal type continuously variable transmission, in addition to the belt type continuously variable transmission.

In the first embodiment, the mode switching switch is the shift lever 96*a*. However, the mode switching switch may be, for example, a paddle switch provided to the steering.

In the first embodiment, the meters (gauges) such as the tachometer 102*a* are the analog type meters (the meters with the needles). However, the analog type meter (the meters with the needles) may be displayed in the meters (gauges) such as the tachometer 102*a* by using a monitor such as liquid crystal. Moreover, it is optional to employ a digital tachometer, a bar graph meter and so on in which the numerals are displayed by using the monitor such as the liquid crystal.

In the first embodiment, the display control unit 87 is a unit different from the CVT control unit 84. However, the display control unit 87 may be provided to the CVT control unit 84.

In the first embodiment, the displayed rotation speed signal is directly outputted from the display control unit 87 to the tachometer 102a. However, this displayed rotation speed signal may be outputted through the hybrid control module 81, the CVT control unit 84 and so on to the tachometer 102a.

In the first embodiment, the various information are inputted from the hybrid control module 81 and the CVT control unit 84 to the display control unit 87. However, these various information may be inputted from the other electric control units 81, 82, 83, 84, 85, and 86 through the CAN communication lines 90 to the display control unit 87. For example, the judgment flags of the shift modes inputted from the CVT control unit 84 may be inputted from the hybrid control module 81 to the display control unit 87. Moreover, the target primary rotation speed Npri* inputted from the hybrid control module 81 to the display control unit 87 may be inputted from the CVT control unit 84 to the display control unit 87.

In the first embodiment, the simulated stepwise shift mode is the "linear shift mode", the "DSTEP shift mode", and the "manual shift mode". However, the simulated stepwise shift mode is a "Ds shift mode". The "Ds shift mode" is a sport mode of the D range. The "Ds shift mode" is a mode to focus on the response characteristic. Besides, a shift control start condition of the "Ds shift mode" is when the driver selects the "Ds shift mode" by operating the shift lever 96a, the paddle switch, the Ds shift mode switch and so on.

In the first embodiment, at step S5 of FIG. 6, when the actual engine speed is not zero, the actual engine displayed rotation speed signal is produced based on the actual engine speed. That signal is displayed as the actual engine speed in the tachometer 102a. However, when the actual engine speed is not zero, the retarded displayed rotation speed signal which is displayed by retarding the actual engine speed is produced until the actual engine speed becomes zero. This signal may be displayed as the first engine speed in the tachometer 102a (the first display mode). In this case, at time t5 of FIG. 7, and in a period from time t5 to time t at which the actual engine speed becomes zero after time t5, the first engine speed is displayed in the tachometer 102a in the first display mode. Then, when the engine speed becomes zero, the display of the tachometer 102a is set to zero by the predetermined inclination.

In the first embodiment, the displayed rotation speed control apparatus for the vehicle according to the present invention is applied to the FF hybrid vehicle. However, the displayed rotation speed control apparatus for the vehicle according to the present invention is applicable to an FR hybrid vehicle, a hybrid vehicle of a longitudinal engine, and so on. That is, it is applicable to a hybrid vehicle in which the continuously variable transmission is mounted in a driving system from the driving source to the driving wheels.

The invention claimed is:

1. A displayed rotation speed control apparatus for a hybrid vehicle including an engine and a traveling motor which are driving sources, and a continuously variable transmission disposed between the traveling motor and driving wheels, the hybrid vehicle having an EV mode in which the traveling motor is used as the driving source, an HEV mode in which the engine and the traveling motor are used as the driving sources, a continuous shift mode in which a transmission gear ratio of the continuously variable transmission is continuously varied, and a simulated stepwise shift mode in which the transmission gear ratio of the continuously variable transmission is stepwisely varied, the displayed rotation speed control apparatus comprising:

a displayed rotation speed controller configured to produce a displayed rotation speed signal to a rotation speed display device disposed within a vehicle interior, the displayed rotation speed controller having a first display mode, a second display mode, and a third display mode, when the mode is switched from the EV mode to the HEV mode to initiate a starting of the engine, and when the mode is switched from the continuous shift mode to the simulated stepwise shift mode while an actual engine speed is smaller than a predetermined rotation speed, the first display mode being configured to display, as a first engine speed, a retarded displayed rotation speed signal for displaying by retarding the actual engine speed in the rotation speed display device, during a period from the initiation of the starting of the engine to a rotation speed smaller than a predetermined rotation speed, in the simulated stepwise shift mode, the second display mode being configured to display, as a second engine speed, a target primary displayed rotation speed signal produced based on a target primary rotation speed according to a target transmission gear ratio stepwisely set, in the rotation speed display device, and when the actual engine speed becomes equal to or greater than the predetermined rotation speed at a first time, the third display mode being configured to display, as a third engine speed, a transition displayed rotation speed signal which is transited from the first engine speed at the first time to the second rotation speed during a predetermined transition time period, in the rotation speed display device.

2. The displayed rotation speed control apparatus for the vehicle as claimed in claim 1, wherein the third display mode is configured to calculate a difference between the first engine speed and the second engine speed during the predetermined transition time period, to produce an inclination characteristic of the transition displayed rotation speed signal transited from the first engine speed to the second engine speed to correspond to an end of the predetermined transition time period, from the difference and the predetermined transition time period, and to display the third engine speed based on the inclination characteristic in the rotation speed display device.

3. The displayed rotation speed control apparatus for the vehicle as claimed in claim 1, wherein a shift mode switching controller is configured to perform a switching control from the continuous shift mode to the simulated stepwise shift mode when an accelerator opening degree becomes equal to or greater than a predetermined accelerator opening degree.

4. The displayed rotation speed control apparatus for the vehicle as claimed in claim 1, wherein the displayed rotation speed control apparatus comprises a shift mode switching switch arranged to be operated by a driver; and a shift mode switching controller is configured to perform a switching control from the continuous shift mode to the simulated stepwise shift mode when the driver switches the shift mode switching switch from the continuous shift mode to the simulated stepwise shift mode.

5. The displayed rotation speed control apparatus for the vehicle as claimed in claim 1, wherein the simulated stepwise shift mode is an automatic simulated stepwise shift mode in which a simulated stepwise shift characteristic is automatically set in accordance with an accelerator opening degree and a vehicle speed.

6. The displayed rotation speed control apparatus for the vehicle as claimed in claim 1, wherein the simulated stepwise shift mode is a manual shift mode in which a stepwise shift characteristic is automatically set in accordance with a switch operation by a driver.

\* \* \* \* \*